United States Patent [19]
Skagerlund

[11] 3,743,419
[45] July 3, 1973

[54] RANGING SYSTEM
[75] Inventor: Lars-Erik Skagerlund, Karlskoga, Sweden
[73] Assignee: Aktiebolaget Bofors, Bofors, Sweden
[22] Filed: July 9, 1969
[21] Appl. No.: 840,276

[52] U.S. Cl. ............ 356/5, 343/13, 343/5 DP
[51] Int. Cl. ........................................... G01c 3/08
[58] Field of Search ............. 356/4, 5; 343/5 DP, 343/13

[56] References Cited
UNITED STATES PATENTS
| | | | |
|---|---|---|---|
| 3,153,230 | 10/1964 | Krevelen et al. | 343/13 |
| 3,181,154 | 4/1965 | Henne | 343/13 |
| 3,432,851 | 3/1969 | Cox, Jr. et al. | 343/6.5 |
| 3,545,861 | 12/1970 | Farnsworth et al. | 356/5 |
| 3,503,680 | 3/1970 | Schenkerman | 356/5 |

FOREIGN PATENTS OR APPLICATIONS
957,235  5/1964  Great Britain ..................... 356/4

Primary Examiner—Benjamin A. Borchelt
Assistant Examiner—S. C. Buczinski
Attorney—Hane & Baxley

[57] ABSTRACT

A radiated-signal reflector ranging system comprising a time measuring device which is started upon the transmission of a signal, and a plurality of registers connected over gates and read-out lines to the time measuring device. The gates are normally closed and are momentarily opened in turn in response to incoming reflected signals, thereby causing the times of arrival of the reflected signals to be recorded in the registers.

7 Claims, 2 Drawing Figures

RANGING SYSTEM

BACKGROUND OF THE INVENTION

The invention relates to improvements in a ranging system of the kind comprising a transmitter for the transmission of a brief pulse of electromagnetic radiation, e.g. a light pulse generated by a laser, a receiver for the reception of reflected pulses, and time-measuring means for measuring the time interval between the transmission of a pulse and the reception of a reflected pulse. This time interval is a measure of the distance to the object which reflected the pulse, and the ranging system is provided with means which make possible a direct readout of the distance for instance from a digital display unit.

The time measuring means comprises an oscillator which generates electric oscillations, and a counter which counts the oscillations generated by the oscillator from the time of the transmission of a pulse.

In the measurement of distances with a system of this kind and particularly when a laser transmitter is used it often happens that a plurality of echo pulses are received for each transmitted pulse because the transmitted radiation is reflected not only by the object to which the distance is to be measured, but also by other objects located before and beyond this object. Also certain atmospheric conditions can give rise to reflections. Thus, if the ranging system is designed to respond only to the first received echo pulse, there is a great probability that the distance indicated thereby is not the distance to the intended object.

To reduce this uncertainty in the distance measurement it has previously been proposed to provide the receiver of the ranging system with blocking means which prevent certain of the incoming echo pulses from actuating the time measuring and recording means of the ranging system. A first such blocking device, called minimum range gate, is adapted to block the receiver for such echo pulses which arrive within a certain minimum time after the transmission of a pulse from the transmitter, and another blocking device, called maximum range gate, is adapted to block the receiver for such echo pulses which arrive after a certain maximum time from the transmission of a pulse. These blocking devices are preferably so designed that the said minimum and maximum times can be adjusted by the operator handling the ranging system. Guided by his own judgment the operator makes an estimation of the distance to the target and the probable error limits of this estimation. With the guidance of this estimation the operator sets the minimum range and maximum range gates. In the following distance measurements only echo pulses from objects situated within the predetermined limits will effectively actuate the receiving means of the ranging system. The said distance limits must, however, be rather wide to make certain that the intended target will be located within the limits. Thus, in addition to the intended target there may still be present several other objects which may give rise to echo pulses. If only one of these echo pulses, for instance the first one to arrive, is caused to actuate the indicating means of the ranging system, there is no certainty that the distance indicated thereby is the distance to the intended target.

To eliminate this uncertainty it has been proposed to provide the ranging system with several indicating devices and means for causing these indicating devices to indicate one distance each of several distances represented by several incoming echo pulses. Thus, the ranging system records several distances at one shot. (The term "shot" here means the transmission of one pulse from the transmitter of the ranging system, for instance a light pulse generated by a laser). By an estimation the operator can then with very large certainty decide which of the recorded distances is the distance to the intended target. In order to make possible the recording of several distances at one shot it is previously known to provide the ranging system with several counters and a distributing device which distributes the incoming echo pulses to the different counters. However, this arrangement means a considerable complication and increase of costs of the equipment.

OBJECT AND SUMMARY OF THE INVENTION

It is an object of the present invention to provide a ranging system and particularly a ranging system utilizing a laser which affords a considerably simpler way of recording several distances at one shot.

According to the invention the system comprises at least one register which is connected to the counter over a gate which is normally closed and which is momentarily opened in response to at least one received reflected pulse, thereby causing the register to record the momentary position of the counter at the time of the reception of the reflected pulse.

If the system comprises several registers these are connected to the counter over one gate each. In such case a distributor is connected to the receiver for automatically distributing incoming pulses to different outputs which are connected to separate ones of said gates so that the respective gate is opened by a pulse appearing on the corresponding output from the distributor, so that the position of the counter at the time of reception of this pulse is recorded in the register connected to the gate.

The counter is preferably so designed that the counting result is presented in binary-coded decimal form and for each decimal digit place it contains four flip-flops which are arranged in known manner to represent the decimal digit in a binary code, for instance the 8421-code. Since the propagation of carry digits in the counter requires a certain time which is not negligible, the reading of the counter may, however, rend a faulty result if the reading occurs while the propagation of carry digits is going on. The error becomes particularly large if the reading takes place during a count step accompanied by carry propagation between decades and additionally a plurality of carry propagations within the most significant decade, as is the case for instance when the counter steps from 799 to 800.

To eliminate this source of errors a preferred embodiment of the invention comprises in addition to the aforementioned counter which in the following will be named main counter, an auxiliary counter which is started by an incoming reflected pulse and thereby prevents further oscillations from the oscillator from actuating the main counter and after a certain time which is sufficiently large to allow the counting elements of the main counter to settle in correspondence to the last received oscillation from the oscillator, transmits a control to the distributor pulse for opening one of the gates.

The auxiliary counter after having performed a predetermined number of counting steps causes the main counter to be actuated again by the oscillations from the oscillator and then causes the main counter to jump over the said predetermined number of counting steps so that the main counter when continuing the counting indicates the number of oscillations which it would have received if the supply of oscillations had not been stopped. When the next echo pulse arrives the main counter is stopped again and then indicates a number of received oscillations corresponding to the time of travel of the last received echo pulse, and this new indication is recorded in a register.

The control input of one of the gates which connect the main counter with a register may be connected to a switch by means of which the gate can be alternatively connected to one of the outputs from the distributor or directly to means for producing a pulse in response to a received echo pulse.

When the gate is connected in accordance with the lastmentioned alternative the corresponding register will successively record the position of the main counter for each received echo pulse, and after the reception of the last echo pulse there remains in this register a recording corresponding to the distance to that object which caused the reflection of the last received echo pulse. This arrangement may be advantageous if the number of incoming echo pulses is larger than the number of registers. By the said arrangement the distance corresponding to the last received echo pulse will always be recorded.

Another embodiment of the invention comprises only two registers and a comparison device which compares the values indicated by the time measuring means with a predetermined reference value and emits different output signals depending on whether the momentary value indicated by the measuring means is less than or larger than the said reference value, and a switching device which makes one or the other of said registers effective on the reception of reflected pulses. Said switching device is controlled by the output signal from the comparison device so that one register is made effective as long as the values indicated by the measuring means are less than said reference value and the other register is made effective when upon reception of the reflected pulses the value indicated by the measuring means for the first time exceeds said reference value.

The said reference value can for instance be a value estimated by the operator or a value obtained in a preceding measuring procedure.

Thus, in this embodiment a remaining recording is obtained only of the distances to those two objects whose distances from the place of measurement is next less than and next larger than the distance represented by the said reference value. The operator selects from these two recorded values that which seems most probable.

In this embodiment also the registers are connected to the counter over gates which are normally closed. The switching device is adapted to open one or the other of the gates on the reception of a reflected pulse depending on whether the value indicated by the counter on the reception of a pulse is less than or larger than the reference value.

DRAWINGS AND DETAILED DESCRIPTION

In the following the invention will be described more in particular with reference to the accompanying drawings.

In the figures like reference numerals designate like parts.

Figure 1:
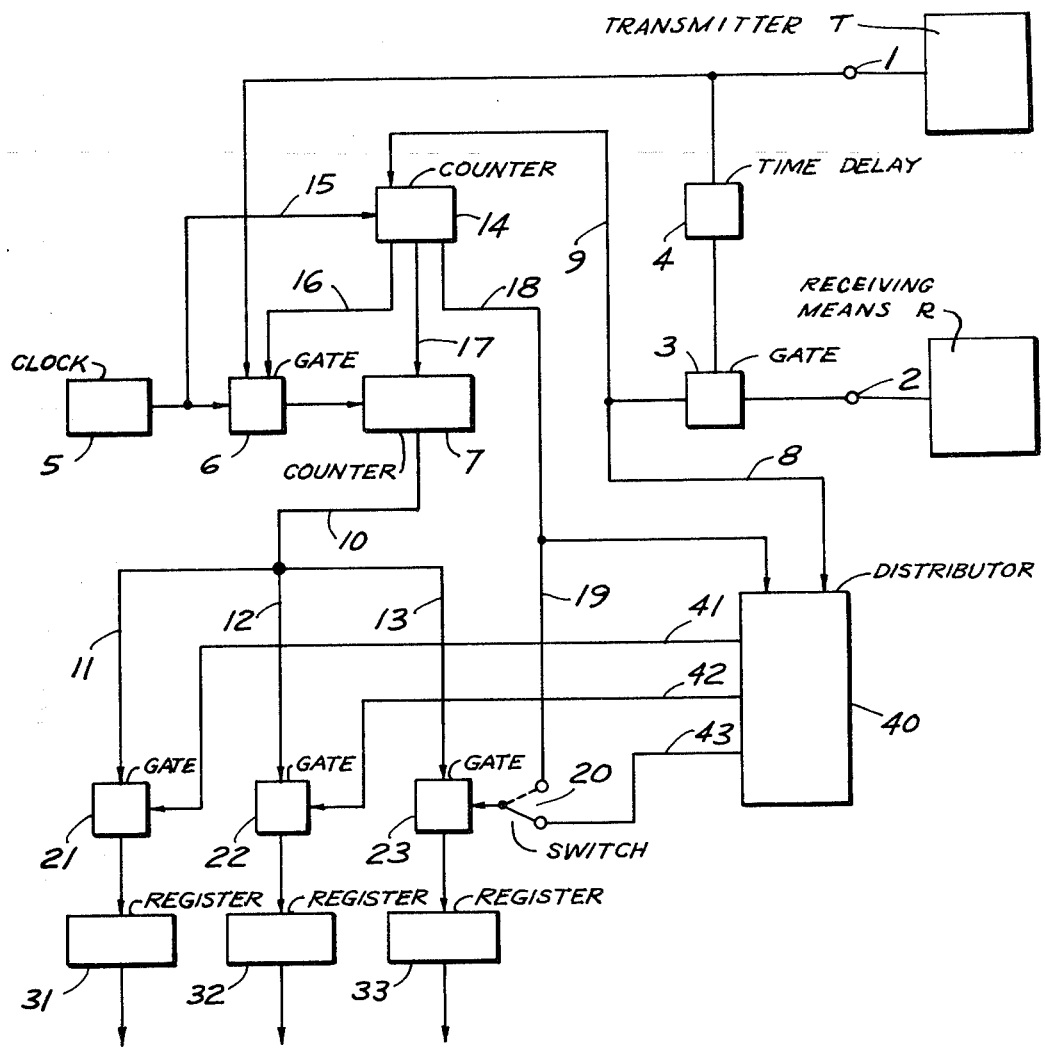
FIG. 1 shows in the form of a block circuit diagram an embodiment of the invention.

Each of the embodiments shown in the drawings may form part of a complete ranging system operating with light pulses generated by a laser transmitter. The generated light pulse is reflected by one or more objects situated in the direction of transmission, and the reflected pulses (the echo pulses) are received and converted to electric pulses and amplified in a receiving system. The laser transmitter and the means for the reception and amplification of the echo pulses are assumed to be designed in some known manner and will not be described in detail.

In FIG. 1 numeral 1 designates a terminal which is connected to a transmitter T which includes a laser transmitter and means which generate a pulse, in the following named starting pulse, at the same time as a light pulse is transmitted from the laser transmitter. The terminal 2 is connected to the receiving means R so that the incoming and amplified echo pulses are supplied to this terminal.

Over terminal 2 the echo pulses are first transferred to a gate 3 which together with a device 4 forms a minimum range gate. As mentioned above, the purpose of this device is to prevent echo pulses which arrive within a certain minimum time after the transmission of a pulse from actuating the counting and indicating means. The device 4 may for instance consist of a time delay device having adjustable time delay which under the action of a start pulse over terminal 1 after a certain time delivers an opening pulse to gate 3.

The means for measuring the time intervals between the start pulse and the echo pulses comprises a clock oscillator 5 and a counter 7, in the following named the main counter. The output of the oscillator 5 is connected to the input of the main counter 7 over a gate 6 which is normally closed and is opened under the action of a start pulse from terminal 1. When gate 6 is opened the main counter 7 receives oscillations from oscillator 5 and counts these oscillations.

The frequency of the oscillations generated by oscillator 5 is determined by the desired measuring accuracy. If for instance a measuring accuracy of 10 meters is desired, the frequency of oscillator 5 should be 15 Mc/s.

The main counter 7 presents the counting result in binary coded decimal form and for this purpose it contains four flip-flops for each decimal digit place. The capacity of the counter is adapted to the maximum distance which is to be measured by the ranging system. If the counter 7 comprises three decimal digit places it can count to 999, and if each count corresponds to a distance interval of 10 meters, the system can measure distances up to 9990 meters. The counter 7 is so designed that after having performed the maximum possible number of counting steps it resets itself and simultaneously emits a pulse to gate 6 which is thereby closed. For reading the state of the main counter 7 there are provided a readout line 10 which is branched in three branches 11, 12 and 13 which are connected over gates 21, 22 and 23 respectively to registers 31, 32 and 33 respectively. The line 10 and each of the branches 11, 12 and 13 contain a number of conductors corresponding to the number of flip-flops in the counter 7, and in the counter the conductors are connected in known manner to each one flip-flop so that one or the other of two potentials appear on each conductor according to the state of the flip-flop.

The registers 31, 32 and 33 are connected over suitable decoders (not shown) to indicating means (not shown) for indicating the values stored in the respective registers. These indicating means may for instance consist of a digital display unit.

The control inputs of gates 21, 22 and 23 are connected to each one output 41, 42, and 43 respectively of a distributing device 40. The echo pulses which pass through the gate 3 are forwarded over line 8 to the distributing device 40 which is designed in known manner so that the first pulse to arrive is passed to output 41, the second pulse to output 42 and the third pulse to output 43. These pulses open the respective gates 21, 22 and 23 so that the setting of the main counter is read out upon the arrival of the respective echo pulses, and the read-out values are stored in the registers 31, 32 and 33 respectively.

As mentioned above it may occur that an echo pulse arrives while the counter 7 is in a stage of transition from one value to the next value. If the read-out of the counter occurs while this transition is going on the read-out value may be entirely erroneous. In order to eliminate this source of error the system is provided with an additional counter, namely the auxiliary counter 14 which has a considerably less counting capacity than the main counter 7. The auxiliary counter 14 is adapted to receive the incoming echo pulses over line 9. An incoming echo pulse starts the auxiliary counter 14 so that it counts oscillations fed to it over line 15 from oscillator 5. At the same time the auxiliary counter 14 transmits a pulse over line 16 which closes gate 6. Hereby the feeding of oscillations from oscillator 5 to the main counter 7 is interrupted, and when the counting members of the main counter 7 have settled in correspondence to the last received oscillation, the main counter remains in the set position. In the meanwhile the auxiliary counter 14 counts oscillations which arrive from oscillator 5 over line 15. When the auxiliary counter 14 has counted a predetermined number of oscillations it transmits over line 14 a pulse to the distributing device 40. The echo pulse which caused the auxiliary counter 14 to start, is also applied over line 8 to the distributing device 40 which, however, in this case is so designed that the echo pulse arriving over line 8 does not immediately cause any output pulse to appear on any of the outputs 41, 42 or 43. Only when a pulse from the auxiliary counter 14 arrives over line 18 to the distributing device 40, one of the outputs 41–43 is activated and the gate 21, 22 or 23 connected to that output is opened during a short period of time whereby the setting of the main counter 7 is recorded in the register 31, 32 or 33 associated with that gate.

After the setting of the main counter 7 has been recorded in this manner, the main counter 7 is started again, for instance by the auxiliary counter 14 upon the next counting step transmitting an opening pulse over line 16 to gate 6. At the same time the auxiliary counter 14 actuates the main counter 7 so that the latter when again receiving oscillations from oscillator 5 jumps over a number of steps corresponding to the number of oscillations counted by the auxiliary counter 14 during the time when the feeding of oscillations to the main counter 7 was interrupted. This jump can be effected in some known manner under the control of the auxiliary counter 14 over line 17. Thus, when the main counter 7 is continuing the counting the number indicated by the main counter 7 will all the time be equal to the total number of oscillations generated by oscillator 5 from the time when the starting pulse arrived over terminal 1. When the auxiliary counter 14 has performed the functions now described it is automatically reset to the zero state. When the next echo pulse arrives the described process is repeated and the setting of the main counter 7 after the arrival of the next echo pulse is recorded in the next register.

The predetermined number of oscillations to be counted by the auxiliary counter 14 before it causes the setting of the main counter to be recorded is determined by the maximum transition time required by the main counter 7 for the transition from one step to the next one. This transition time may in the most unfavorable case amount to 100 nanoseconds. If the ranging system is designed for a measuring accuracy of 10 meters, the oscillations from the oscillator 5 should have a period of about 67 nanoseconds which is less than the said maximum transition time for the main counter 7 but larger than one half of this transition time. In this case the auxiliary counter 14 should therefore be adapted to count two oscillations before it causes the setting of the main counter 7 to be read out and recorded in one of the registers 31–33, and when the main counter 7 is started again it should be caused to skip two steps.

The device described above and shown in FIG. 1 is designed for recording three distances. However, it will be understood that the device can be designed for recording a larger number of distances by increasing the number of registers and the associated gates and providing the distributing device 40 with more outputs.

However, in a distance measuring operation it may occur that the number of objects situated at different distances from the ranging system and giving rise to echo pulses larger than the number of recording elements in the ranging system so that the distances to all these objects cannot be recorded. If the time measuring and recording means operate in the manner described above and the number of registers is for instance three as in the shown embodiment, the distances to the three nearest objects will be recorded while the distances to additional objects which give rise to echo pulses will not be recorded. However, it may of interest in this case to know the distance to the most remote object, that is the distance to the object which reflects the last received echo pulse. This is possible in the embodiment shown in FIG. 1 by means of a manually operable switch 20 which alternatively connects the control input of gate 23 to the output 43 of the distributing device 40 or to a branch 19 of the line 18 from the auxiliary counter 14. When the switch 20 is in the position indicated by a full line on the drawing and assuming that the outputs 41, 42 and 43 of the distributing device 40 is activated in the said order in response to the incoming echo pulses, the third echo pulse will cause the gate 23 to be opened so that the corresponding distance is recorded in the register 33. If the switch 20 is in the position indicated by the dotted line, the gate 23 will receive an opening pulse from the auxiliary counter 14 for each received echo pulse, and the distances to all objects giving rise to echo pulses will be recorded in turn in register 33. For each new recording in the register the previous recording is cancelled. After the measuring procedure has been finished a recording corresponding to the distance to the most remote object will therefore remain in register 33, while registers 31 and 32 indicate the distances to the two nearest objects.

In some cases it is of interest only to know the distance to the most remote object. In such case the distance may comprise only one register (33 in FIG. 1), and the associated gate (23) may have its control input permanently connected to the mans (e.g. the auxiliary counter 14) for producing opening pulses in response to the received echo pulses. In this case the distributing device 40 may be omitted.

The distributing device 40, if provided, may be combined with means for counting the total number of incoming echo pulses or the number of echo pulses other than those which cause a recording.

Figure 2:
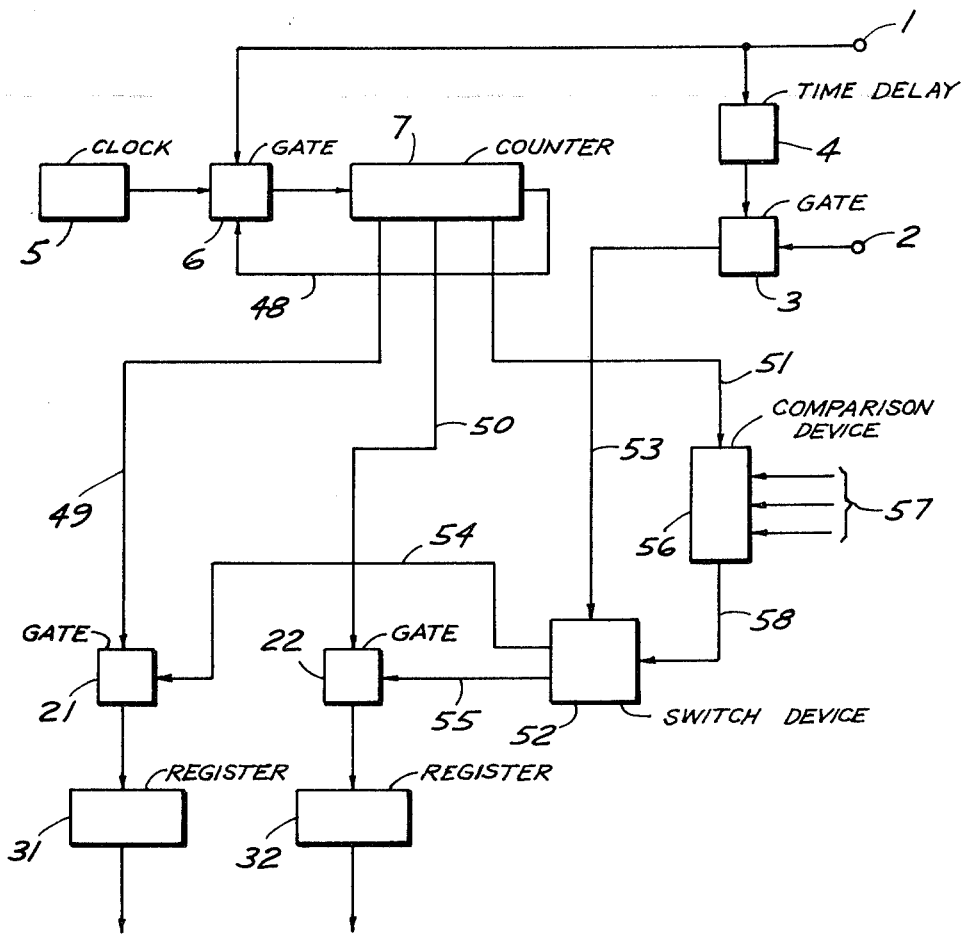
FIG. 2 shows another embodiment of the invention.

FIG. 2 shows an embodiment in which a recording is obtained only of the distances to two objects whose distances from the measuring site is nearest less than and nearest larger than a certain predetermined reference value.

In FIG. 2 numerals 1–7 designate the same parts as in FIG. 1.

For the read-out of the counter 7 there are provided three read-out lines 49, 50 and 51. Line 49 is connected over gate 21 to a first register 31, and line 50 is connected over gate 22 to a second register 32. The registers 31 and 32 are connected over suitable decoding means (not shown) to indicating means (not shown) for indicating the numbers stored in the respective registers.

The gates 21 and 22 are normally closed. Their control inputs are connected to outputs 54 and 55 respectively of a switching device 52. The echo pulses which arrive over terminal 2 and pass through gate 3 are transferred over line 53 to this switching device 52. The switching device 52 directs the received pulses either over output 54 to gate 21 or over output 55 to gate 22 in dependence of a control signal which is applied over line 58 to the switching device 52 from a comparison device 56. When gate 21 or gate 22 receives a pulse the gate is opened so that the setting of the counter 7 at this time is recorded in the register 31 or 32 respectively.

The comparison device 56 is connected to the counter 7 over the read-out line 51 and thus receives a continuous information on the setting of the counter. A reference value corresponding to an estimated distance is fed into the comparison device 56 over lines 57. The reference value is represented in some known manner by a suitable combination of signals on lines 57.

In the comparison device 56 the setting of counter 7 is compared with the said reference value. As long as the value indicated by counter 7 is less than the reference value the comparison device 56 delivers an output signal of a first kind over line 58 to the switching device 52 which is controlled by this output signal so that the echo pulses arriving over line 53 are directed to gate 21 over line 54. Therefore, as long as the counter 7 indicates values below the reference value the setting of the counter 7 for each incoming echo pulse will be recorded in register 31. For each new recording the previous recording is cancelled.

When the counter 7 indicates values exceeding the reference value the comparison device 56 delivers an output signal of a second kind which actuates the switching device 52 so that the next echo pulse to arrive is directed over line 55 to gate 22 so that the gate is opened and the setting of the counter 7 at the time of arrival of this pulse is recorded in register 32. After that the register 32 is immediately blocked so that this recording remains even if additional echo pulses should arrive. This blocking can be effected by a suitable design of register 32 or by designing the switching device 52 in such manner that it only allows one single pulse to be applied to gate 22, when the output signal from the comparison device 56 is of the said second kind. The output signals from the comparison device 56 may consist of different potentials on line 58, and one of these potentials may even be zero potential.

The various parts included in the device according to the invention such as the clock oscillator, counters, gates, switches and registers are all designed in a manner well known in the art, and therefore they have not been described in detail. The parts are of course of the electronic type and are preferably equipped with semiconductor components.

The embodiments described and shown are given by way of examples only and can be modified in many ways within the scope of the invention.

What is claimed is:

1. Ranging system comprising transmitting means for transmitting a short-duration pulse of electromagnetic radiation, receiving means for receiving reflected pulses, and time measuring means for measuring the time interval between the transmission of a pulse and the reception of one or more reflected pulses, said time measuring means including an oscillator for generating electric oscillations and a first counter for counting the oscillations generated by the oscillator from the time of transmission of a pulse, characterized in that it further comprises at least one register (31,32,33), connecting means (11,12,13) connecting said first counter (7) with the said register, a normally closed gate (21,22,23) in said connecting means, gate opening means (40,41,42,43) for momentarily opening said gate in response to a control pulse after at least one received reflected pulse, thereby causing the said register to record the momentary position of the said counter at the time of the reception of the reflected pulse, and a second counter (14) which is started in response to an incoming reflected pulse and then prevents further oscillations from the oscillator (5) to act upon said first counter (7) and after a time which is sufficiently long to allow the first counter to settle in response to the last received oscillation from the oscillator, transmits a control pulse to said gate opening means for opening one of said gates.

2. Ranging system as claimed in claim 1, characterized in that it comprises a plurality of registers (31,32,33) which are connected to said first counter (7) over separate gates (21,22,23), and that a distributing device (40) is connected to the said receiver means of reflected pulses, said distributing device being adapted to distribute automatically incoming pulses to different outputs (41,42,43) which are connected to separate ones of said gates (21,22,23), so that each gate is opened by a pulse appearing on the corresponding output from said distributing device so as to cause the time for the appearing of this pulse to be recorded in the register associated with the gate.

3. Ranging system as claimed in claim 1, characterized in that said second counter (14) after a predetermined number of counting steps causes the first counter (7) to respond again to oscillations from said oscillator, thereby causing the counter to continue the counting and in doing so jumping over said predetermined number of counting steps.

4. Ranging system as claimed in claim 1, characterized in that the control input of at least one (23) of said gates is directly connectable to means (14) for producing opening pulses in response to received reflected pulses.

5. Ranging system as claimed in claim 4, characterized in that the control input of at least one (23) of said gates is connected to a switch (20) for alternatively connecting said control input to one (43) of the outputs from said distributing means (40) or directly to said means (14) for producing opening pulses in response to received reflected pulses.

6. Ranging system comprising transmitting means for transmitting a short-duration pulse of electromagnetic radiation, receiving means for receiving reflected pulses, and time measuring means for measuring the time interval between the transmission of a pulse and the reception of at least one reflected pulse, said time measuring means including an oscillator for generating electric oscillations and counting means for counting the oscillations generated by said oscillator from the time of transmission of a pulse, a first register and a second register for recording the values indicated by said time measuring means, a comparison device for comparing the values indicated by said time measuring means with a predetermined reference value and to produce different output signals depending on whether the value indicated by said time measuring means is less or greater than said reference value, and switching means for making one or the other of said registers effective to record the position of said counting means upon the reception of reflected pulses, said switching means being controlled by the output signal from said comparison device so that one register is made effective as long as the values indicated by said measuring means are less than said reference value and the other register is made effective when, upon the reception of the reflected pulses, the value indicated by said time measuring means for the first time exceeds said reference value.

7. Ranging system as claimed in claim 6, wherein each of said registers is connected to said time measuring means via a gate which is normally closed, and said switching means, upon the reception of a reflected pulse, opens one or the other of said gates depending on whether the value indicated by said time measuring means upon the reception of that pulse is less or greater than said reference value.

* * * * *